UNITED STATES PATENT OFFICE.

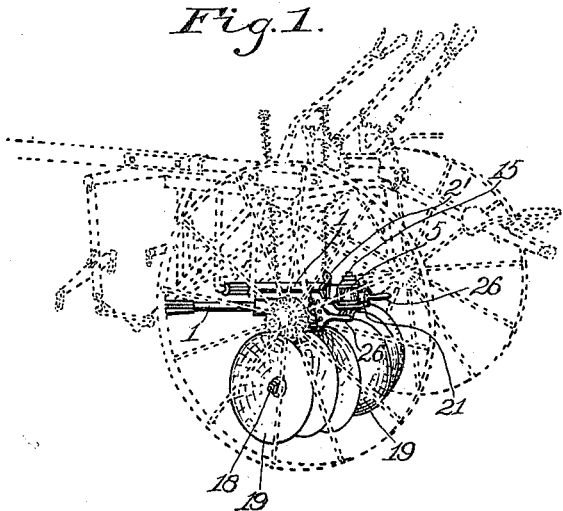
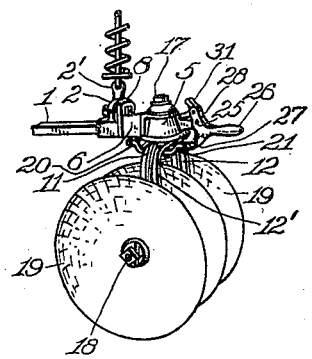
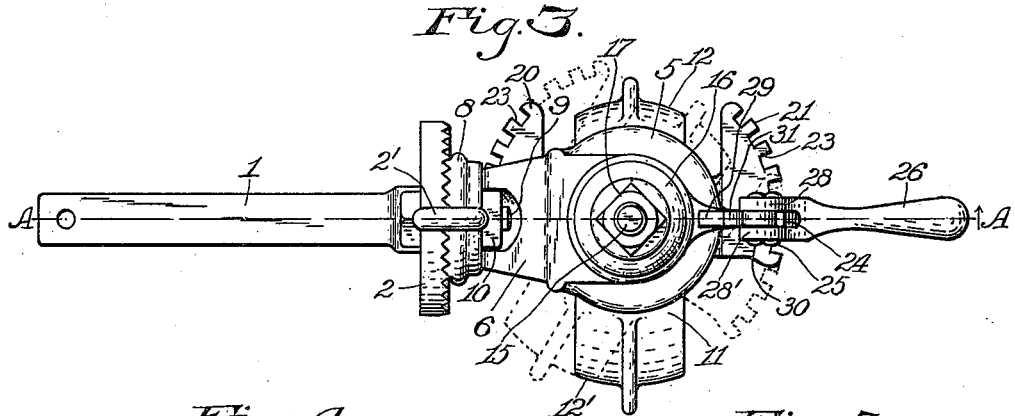
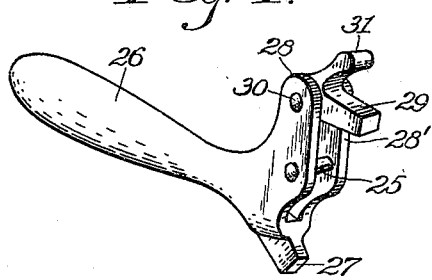
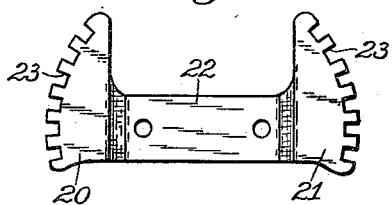

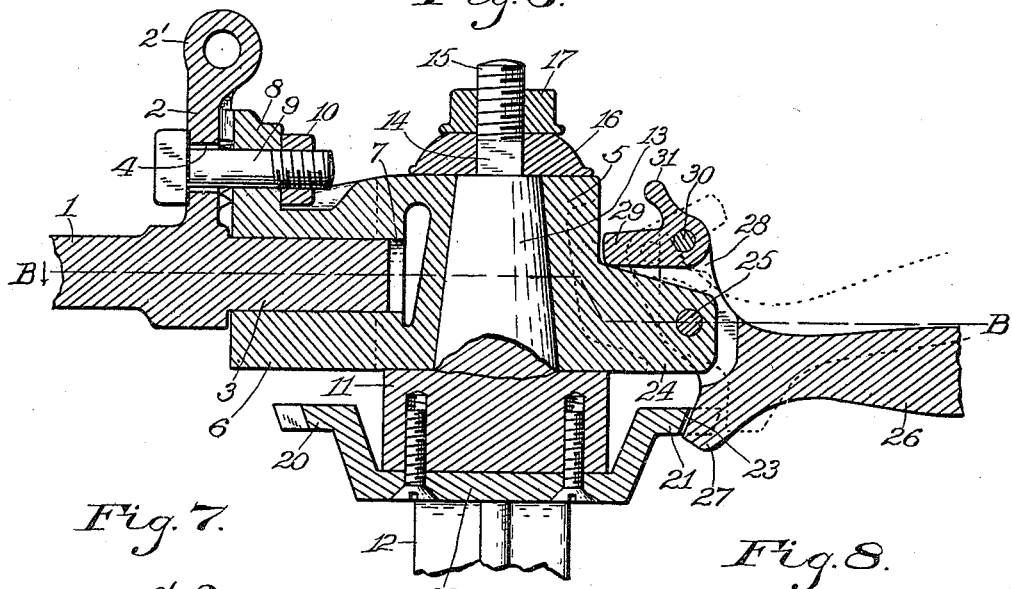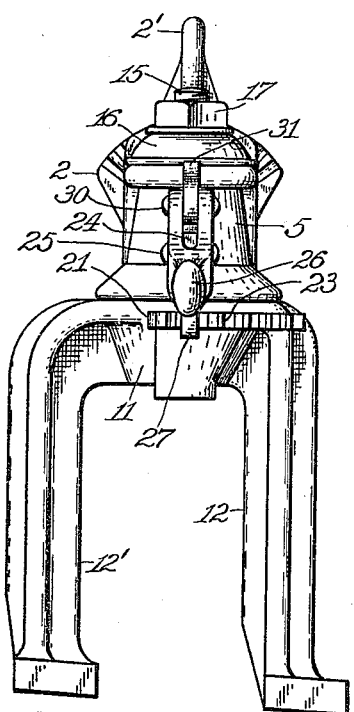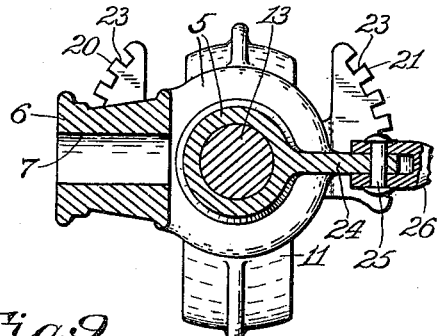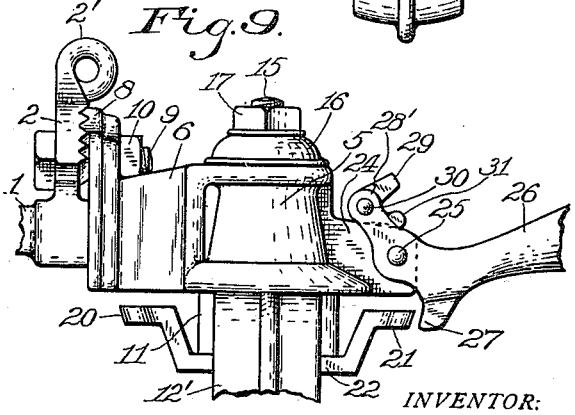

WILLIAM M. WILLMORE, OF VINCENNES, INDIANA.

ADJUSTABLE CULTIVATOR-FRAME.

993,489.  Specification of Letters Patent.  Patented May 30, 1911.

Application filed October 29, 1910. Serial No. 589,674.

*To all whom it may concern:*

Be it known that I, WILLIAM M. WILLMORE, a citizen of the United States, residing at Vincennes, in the county of Knox and State of Indiana, have invented certain new and useful Improvements in Adjustable Cultivator-Frames; and I do declare the following to be a full, clear, and exact description of the invention, reference being had to the accompanying drawings, and to the letters and figures of reference marked thereon, which form a part of this specification.

This invention relates to farming implements commonly known as cultivators, more especially to wheeled disk cultivators, the invention having reference particularly to the frames in which the cultivators are mounted and thereby connected with the main frames of the implements.

The object of the invention is to provide an improved adjustable cultivator frame for operating disk cultivators or other implements which may require to be reversed or to be readjusted; a particular object being to provide an improved disk cultivator frame in which the yokes having the cultivators mounted thereon may be quickly adjusted to suit requirements, or reversed and adjusted as may be desired or required in operation, to enable the disks to turn over the earth either toward or from the plants or to greater or relatively less extent.

A particular object is to provide an adjustable cultivator frame of the above mentioned character which may be cheaply constructed and be durable in use, and without requiring the use of tools, or detachment of parts of the frame in making the adjustments desired.

The invention consists in an improved cultivator frame comprising a head adapted to be connected with operating and controlling apparatus, a yoke adapted to have cultivators mounted thereon and mounted adjustably in the head, and movable latching apparatus for locking the yoke to the head when adjusted; the invention consisting further in the novel parts, and combinations and arrangements of parts, as hereinafter particularly described and pointed out in the appended claims.

Referring to the drawings, Figure 1 is a perspective view of two gangs of cultivators and their frames which are constructed substantially in accordance with the invention and shown in their relation to the main frame or sulky, the latter being illustrated by broken lines; Fig. 2, a perspective view of a gang of disk cultivators and the improved frame mounted thereon; Fig. 3, a top plan of the improved cultivator frame; Fig. 4, a perspective view of the principal parts of the latching apparatus; Fig. 5, a plan view of portions of the latching apparatus; Fig. 6, a fragmentary section on the line A A in Fig. 3; Fig. 7, a rear elevation of the improved frame; Fig. 8, a fragmentary horizontal section on the line B B in Fig. 6; and Fig. 9, a fragmentary side elevation of the improved frame.

Similar reference characters in the different figures of the drawings indicate corresponding elements or features of construction herein referred to.

As preferably constructed each gang frame comprises a beam 1 adapted to be connected at one end thereof to the main frame or sulky, the opposite end portion of the beam having a serrated quadrant 2 thereon provided with an eye 2' adapted to be connected to suitable means for lifting and controlling the gang of cultivators, the beam having also a pivot 3 thereon adjacent to the quadrant, the quadrant having a curved slot 4 therein. A head 5 has a lateral extension 6 on one side thereof in which is a pivot bearing 7 receiving the pivot 3. The extension of the head has a serrated arm 8 thereon which normally is in contact with the quadrant 2 and held securely by means of a bolt 9 inserted in it and extending through the slot 4, the bolt being provided with a nut 10.

Each disk-yoke comprises a main portion 11 from which extend two arms 12 and 12', the upper side of the main portion having a pivot 13 thereon which is mounted rotatably in the head 5 so as to constitute a vertical axis for the yoke, the pivot preferably having a squared portion 14 from which extends a screw threaded end portion 15, there being a washer 16 on the squared portion, and a nut 17 on the end portion whereby the pivot 13 is retained rotatably in the head 5. An axle 18 is connected to the arms of the yoke and a suitable number of disk cultivators 19 mounted thereon, as is understood.

The main portion 11 of the yoke has a quadrant 20 on the forward side thereof and another quadrant 21 on the rear side thereof which preferably are cast on a base plate 22 suitably secured to the under side of the main portion 11 of the yoke. Each quadrant has a suitable number of notches or recesses 23 therein. The head 5 has a projection 24 thereon in which is a pivot 25, and a latch handle 26 is mounted on the pivot 25 and has a downwardly extending latch bar 27 which is adapted to fit closely into any one of the notches 23 that may be brought within range of it. The handle extends horizontally so that its weight normally holds the latch-bar in contact with the quadrant. The handle preferably has two ears 28, 28', thereon between which a locking-dog 29 is mounted on a pivot 30 connected to the ears, the dog being adapted to rest upon the projection 24 in contact with the body of the head 5 to prevent the latch-bar 27 from being withdrawn from the quadrant, the dog being provided with a finger-hold 31 which rests upon the projection 24 when the dog is thrown back to permit the latch-bar 27 to be withdrawn from the quadrant.

It will be understood from the foregoing that when the bolt 9 is slackened the yoke may be adjusted on the pivot 3 to suit requirements, and further adjustments may be infrequent.

When it is desired to re-adjust the cultivating disks the dog 29 is thrown back and the handle 26 is then lifted so that it withdraws the latch-bar 27 from the quadrant, as illustrated in Fig. 9 and in dotted lines in Fig. 6. The yoke when unlatched may be rotated in the head 5 until it is adjusted as desired or is reversed if so desired, and the handle is lowered so as to carry the latch-bar 27 into one of the notches 23, which securely latches the yoke to the frame head, and then the dog 29 is thrown to its normal position illustrated clearly in Fig. 6 to prevent accidental withdrawal of the latch-bar.

Having thus described the invention, what is claimed as new, is—

1. In a disk-cultivator, a head, a disk-carrying yoke rotatably mounted in the head and having a notched quadrant on one side thereof concentric to the rotative axis of the yoke, a handle pivotally mounted on the head and having a latchbar thereon movable into or out of the notches of the quadrant, and a locking dog pivotally mounted on the handle and normally extending against the head.

2. In a disk-cultivator, a head, a disk-carrying-yoke comprising a main portion having a pivot and also arms thereon, the pivot being mounted rotatably in the head, a plate secured to the main portion of the yoke and having two notched quadrants thereon extending at opposite sides of the main portion, and a handle pivotally mounted on the head and extending laterally therefrom, the handle having a latch-bar thereon normally extending downwardly into a notch of the adjacent one of the quadrants.

3. In a disk-cultivator, a head, a disk-carrying yoke comprising a main portion having a pivot thereon extending rotatably through the head, the main portion having also arms thereon, said pivot having a squared portion from which extends a screw-threaded end portion, a washer on said squared portion in contact with the head, a nut on the end portion, a plate secured to the main portion of the yoke and having two quadrants thereon, and a latch pivoted to the head and normally engaging one of the quadrants.

4. In a disk-cultivator, a head having a projection thereon, a disk-carrying yoke rotatably mounted in the head, a plate secured to the yoke and having two notched quadrants thereon, a beam connected to the head, and a handle pivoted to the projection of the head and having a latch-bar thereon movable into or out of locking engagement with an adjacent one of the quadrants.

5. In a disk-cultivator, a head having a projection thereon, a disk-carrying yoke rotatably mounted in the head and having a notched quadrant on one side thereof in a plane below the projection, a handle pivoted on the projection and having a latch-bar thereon movable into locking engagement with the quadrant, the handle having also two ears thereon, a locking dog between the ears and pivoted thereto, the dog normally resting on the projection in contact with the head and having a finger-hold thereon to engage the projection when the dog is moved away from the head.

6. In a disk cultivator, a head having a projection thereon, a disk-carrying yoke rotatably mounted in the head and having a quadrant on one side thereof in a plane below the projection, a latch pivoted on the projection and movable into locking engagement with the quadrant, the latch having an upwardly extending ear thereon, and a locking dog pivoted on the ear and adapted to engage the body of the head.

In testimony whereof, I affix my signature in presence of two witnesses.

WILLIAM M. WILLMORE.

Witnesses:
NINA BRADLEY,
A. M. WILLOUGHBY.